United States Patent

Torsti

[11] Patent Number: 5,917,856
[45] Date of Patent: Jun. 29, 1999

[54] METHOD FOR ESTABLISHING A PAM SIGNAL CONNECTION USING A TRAINING SEQUENCE

[75] Inventor: Simo-Pekka Torsti, Espoo, Finland

[73] Assignee: Nokia Telecommunications Oy, Espoo, Finland

[21] Appl. No.: 08/849,010

[22] PCT Filed: Oct. 30, 1995

[86] PCT No.: PCT/FI95/00598

§ 371 Date: Apr. 30, 1997

§ 102(e) Date: Apr. 30, 1997

[87] PCT Pub. No.: WO96/13908

PCT Pub. Date: May 9, 1996

[30] Foreign Application Priority Data

Oct. 31, 1994 [FI] Finland ................................ 945123

[51] Int. Cl.⁶ ........................................................ H03H 7/30
[52] U.S. Cl. ........................... 375/231; 375/353; 370/292
[58] Field of Search ..................................... 375/231, 222, 375/346, 353; 370/286, 292

[56] References Cited

U.S. PATENT DOCUMENTS

| | | | |
|---|---|---|---|
| 4,489,416 | 12/1984 | Stuart | 375/13 |
| 4,577,328 | 3/1986 | Senoo | 375/231 |
| 4,621,366 | 11/1986 | Cain et al. | 375/231 |
| 4,674,103 | 6/1987 | Chevillat et al. | 375/13 |
| 4,849,989 | 7/1989 | Kamerman | 375/13 |
| 4,868,850 | 9/1989 | Kaku et al. | 375/13 |

FOREIGN PATENT DOCUMENTS

| | | |
|---|---|---|
| 228771 | 7/1987 | European Pat. Off. . |
| 0368189 | 5/1990 | European Pat. Off. . |
| 373277 | 6/1990 | European Pat. Off. . |
| 384490 | 8/1990 | European Pat. Off. . |
| 391715 | 10/1990 | European Pat. Off. . |
| 0403716 | 12/1990 | European Pat. Off. . |
| 573696 | 12/1993 | European Pat. Off. . |
| 2 198 015 | 6/1988 | United Kingdom . |

OTHER PUBLICATIONS

Benndorf, J. et al.: "Application of Fast convolution Algorithms Using Sampling Frequency change in Digital High-Speed Modems".

*Primary Examiner*—Temesghen Ghebretinsae
*Attorney, Agent, or Firm*—Pillsbury Madison & Sutro LLP

[57] ABSTRACT

In a method for establishing a data communication connection in a data channel utilizing PAM signals, a transmitter transmits a training sequence, formed of predetermined symbols, a predetermined number of times. The data channel is monitored in order to detect a predetermined signal, samples are taken and amplification is adjusted in such a way that the signal, settle at a predetermined level. In order that the method can be applied in a data channel with previously unknown properties, when the transmitter starts repeating the training sequence, samples taken from the data channel are buffered to form a sample sequence. A channel pulse response estimate is calculated by convoluting the buffered samples with a predetermined symbol sequence. A main sample is selected, correction coefficients are calculated on the basis of the samples preceding and following the main sample, and, when the transmitter starts transmitting data, the samples taken from the data channel are corrected by utilizing the correction coefficients.

5 Claims, 2 Drawing Sheets

METHOD FOR ESTABLISHING A PAM SIGNAL CONNECTION USING A TRAINING SEQUENCE

This application is a national phase of international application PCT/FI95/00598, filed Oct. 30, 1995 which designated the U.S.

BACKGROUND OF THE INVENTION

The invention relates to a method for establishing a data communication connection in a data channel where PAM signals are utilized, the transmitter transmitting a training sequence, formed of predetermined symbols, a predetermined number of times, in which method: the data channel is monitored in order to detect a predetermined signal, samples are taken from the data channel, and the amplification of the receiver is adjusted in such a way that the received signals settle at a predetermined level.

The invention relates especially to multipoint modem networks utilizing PAM (Pulse Amplitude Modulation) signals and comprising one master modem which transmits the same data to several slave modems. The slave modems alternately transmit data to the master modem by reserving the channel in turn for their own use. In addition to transmission rate, training time also significantly affects the amount of data that can be transmitted in a time unit in such a network. In this connection, training time refers to the time required for establishing a connection. During the training time, synchronization is performed with the remote clock, and a descrambler and amplification are set, among other things.

In a previously known arrangement for establishing a datacommunication connection, fixed correction coefficients, dependent on the data channel used, are determined beforehand for the receiver, and, by means of the coefficients, the interference resulting from the data channel, between the symbols to be transmitted, is compensated for. A typical known equalizer of this type is a FIR (Finite Impulse Response) equalizer by means of which both the front part and the tail part can be removed from a pulse response. Since the correction coefficients are fixed, a connection can be established by setting correct amplification, synchronizing the receiver with the transmitter clock, and by setting a descrambler.

The major drawback of the aforementioned known solution is that when it is applied, the pulse response of the data channel must be known, so that the fixed correction coefficients can be set correctly. For example, when a multipoint network is set up, the assembler must manually adjust the correction coefficients of each modem to a suitable value. This is due to the fact that, for example when a copper cable is used, the pulse response of the data channel changes according to the cable length, so that the correction coefficients must always be set specifically for each case.

SUMMARY OF THE INVENTION

The purpose of the present invention is to eliminate the aforementioned drawback and to provide a method of establishing a datacommunication connection, which method requires no manual adjustments of the type described above. This object is achieved with the method according to the invention, characterized in that when the transmitter starts repeating the training sequence, during a time period it takes to transmit one training sequence the samples taken from the data channel are buffered in order to form a sample sequence, a channel pulse response estimate is calculated by convoluting the buffered samples with a predetermined symbol sequence, a main sample is selected from the pulse response estimate, correction coefficients are calculated from the pulse response estimate on the basis of the samples preceding and following the main sample, in order to minimize the interference on the data channel. And when the transmitter stops transmitting the training sequence and starts transmitting data, the samples taken from the data channel are corrected by utilizing the correction coefficients calculated.

The invention is based on the idea that when the receiver is adapted to calculate the pulse response estimate, on the basis of a predetermined training sequence transmitted through the data channel, by convoluting samples taken from the received training sequence with a predetermined sample sequence, and when the correction coefficients are set on the basis of the calculated pulse response estimate, there is no need to preadjust the receiver according to the properties of the data channel to be used. When the method according to the invention is applied, the receiver can itself detect the properties of the data channel and select the correction coefficients suitable for the data channel in question. The major advantages of the True Fast Poll method according to the invention are therefore that the method can be applied in data channels with an unknown pulse response, and that a datacommunication connection can be established within a very short time by means of the method. For example, when a 2B1Q signal is used, the receiver can be prepared for data transmission within a time required for transmitting 60 symbols (when the length of the correctors is 20 symbols). When the pulse response estimate is calculated with the method according to the invention, the rotation of the training sequence perceived by the receiver is insignificant, since the possible rotation can be compensated for during the selection of the main sample.

In the following, the invention will be described in greater detail by means of a preferred embodiment of the method according to the invention, with reference to the accompanying drawings, in which.

DETAILED DESCRIPTION

Figure 1:
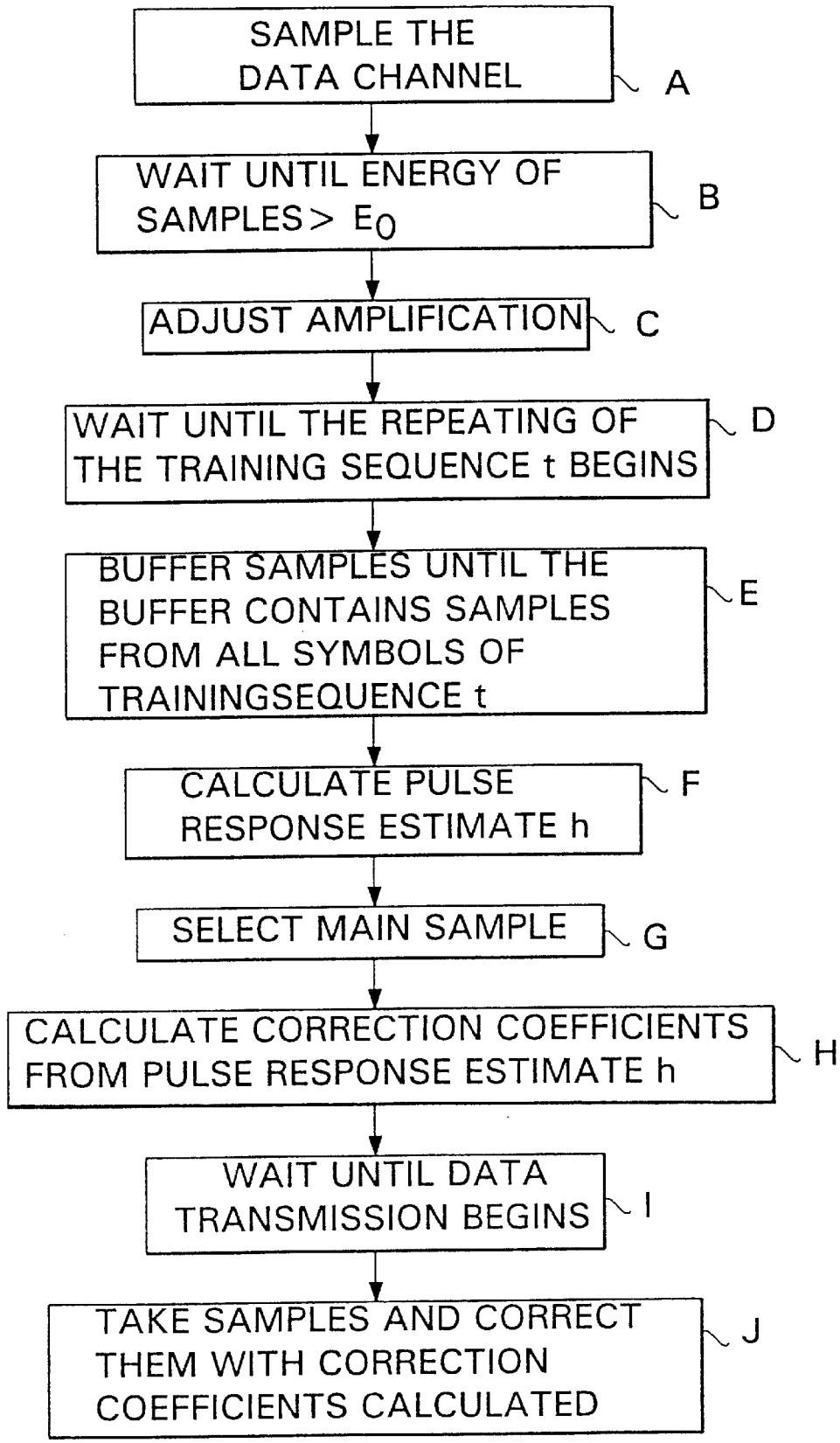
FIG. 1 is a flow chart of the method according to the invention.

FIG. 1 is a flow chart of a preferred embodiment of the method according to the invention, applicable in establishing a data communication connection, for example in a multipoint modem network utilizing PAM signals, such as 2B1Q signals, and employing a copper cable as a data channel. However, it should be noted that the method according to the invention can also be utilized in other connections, for example in a radio channel or in an optical data channel.

In the case of FIG. 1, the transmitter can be adapted to repeat three times a training sequence of 20 symbols, after which the transmitter starts transmitting data. The receiver knows beforehand the symbols included in the training sequence, and the number of times the training sequence is repeated. The training sequence is a predetermined symbol sequence containing no DC, and having a spectrum that is as even as possible, and an energy amount corresponding as accurately as possible to the average energy of symbols transmitted in the actual data transmission, so that the amplification can be adjusted to the correct level in the receiver. The length of the training sequence used must be such that the pulse responses that must be corrected are shorter in time than the time it takes to transmit the training sequence.

In method step A, the receiver is adapted to monitor the data channel in order to detect a predetermined signal. The receiver can be arranged, for example, to sample the data channel twice during a symbol.

In method step B, the energy of the samples from the data channel is examined. The detection of energy from the line can be utilized as the predetermined signal. The receiver remains in the wait condition until energy arrives from the data channel after the transmitter has started transmitting the training sequence t. The receiver detects this in such a way that the energy contained in the samples exceeds a predetermined threshold $E_0$.

In method step C, the amplification of the receiver is adjusted to a suitable level, so that an A/D converter provided in the receiver can sample the line with a sufficient accuracy.

In method step D, the receiver waits until the transmitter starts repeating the training sequence t. Since, the receiver is aware of the length of the training sequence transmitted by the transmitter, there are two ways of finding out the moment the training sequence will be repeated:

calculating correlation for signals arriving from the line, or measuring time from the moment energy was first detected on the line. When the time required for transmitting the training sequence has elapsed since the time the energy increase was detected, the transmitter starts repeating the training sequence.

However, when the method according to the invention is applied, there is no need to determine the starting point of the second training sequence with an accuracy of a symbol, but it is sufficient that method step E will not be started until it is certain that the first training sequence is over (the second or third training sequence must be used when the pulse response estimate is calculated, so that the tails of the preceding training sequence can be made visible).

In method step E, the receiver is adapted to sample the line for the time it takes to transmit the training sequence t, and to buffer the samples taken. The buffer will thus contain a sequence t' formed of forty samples, if the length of the training sequence is 20 characters and the sampling frequency is 2 samples/symbol. If the moment the sampling of the line begins does not correspond exactly to the starting point of the training sequence, it means that the sample sequence gathering in the buffer is slightly rotated (i.e. the first buffered sample has been taken, for example, from the third symbol of the training sequence, etc.) However, this does not cause problems in the application of the method of the invention, since according to the invention, the transmitter is arranged to repeat the training sequence more than once so that the sequence gathering in the buffer contains samples of all the symbols of the training sequence, even though the buffered sequence may be rotated. Possible rotation does not require additional operations (since such rotation will be compensated for when the main sample is selected), wherefore the invention will be described below assuming that the sequence t' is not rotated, but the first and the second (if samples are taken twice during a symbol) buffered sample have been taken from the first symbol of the training sequence.

In method step F, the pulse response estimate of the data channel is calculated by means of the buffered samples. When a training sequence t has been transmitted through the data channel h, a sequence t'=t*h (*=convolution) is formed in the buffer of the receiver. When the buffered sequence t' is convoluted with a predetermined sequence r, the following sequence is received, r*t'=r*(t*h)=(r*t)*h=k*h, i.e. the channel impulse response convoluted with the sequence k. If the sequence r is suitably selected, the sequence k is a pulse supplemented with DC, wherefore if the sequence h does not contain DC, the convolution k*h will result in h, i.e. the channel pulse response.

The selection of the aforementioned predetermined sequence r depends entirely on the selection of the training sequence t. A possibility of selecting the training sequence t and the aforementioned predetermined sequence r is illustrated in the following table:

| t(n) | r(n) | k(n) = t(n)*r(n) |
|---|---|---|
| 3  | 0.038688  | −0.05 |
| 1  | −0.02839  | 0.95 |
| −1 | −0.01401  | −0.05 |
| 1  | −0.02245  | −0.05 |
| 1  | −0.02169  | −0.05 |
| −3 | 0.033688  | −0.05 |
| 1  | 0.013943  | −0.05 |
| −1 | −0.00848  | −0.05 |
| 3  | 0.00036   | −0.05 |
| −1 | 0.029305  | −0.05 |
| 3  | 0.030066  | −0.05 |
| 3  | −0.00631  | −0.05 |
| −1 | 0.036667  | −0.05 |
| −1 | −0.01183  | −0.05 |
| 1  | 0.023045  | −0.05 |
| 3  | −0.02542  | −0.05 |
| −3 | 0.011836  | −0.05 |
| −3 | 0.019051  | −0.05 |
| −3 | −0.00641  | −0.05 |
| −3 | 0.008344  | −0.05 |

It can be seen from the table that when the recurrent training sequence t is convoluted with the sequence r, i.e.

$$k(n) = t(n) * r(n) = \sum_{j=0}^{N-1} t(n-j) \cdot r(j)$$

(where N=length of the training sequence t), the result is sequence k consisting of a value one and of n−1 other values (that approximate to zero).

In other words, when the training sequence t has been transmitted through the data channel h, it is visible in the buffer of the receiver as the sequence t', and when this sequence is convoluted with a predetermined sequence r, the result is the sequence r*t'=r*(t*h)=(r*t)*h=k*h, which is the channel pulse response h, if h does not contain DC.

If samples are taken twice during a symbol and the length of the training sequence t is 20 symbols, the length of the buffered sequence t' is 40 elements. Therefore the length of the predetermined sequence r must also be 40 elements. This can be implemented in such a way that every other element in the sequence r is taken from the table above, and zero is set as the value of every other element (i.e. r=[0.038688, 0, −0.02839, 0, 0.01401, 0, . . . ]).

In method step G, the main sample is selected from the pulse response estimate. This can be performed for example, in such a manner that all the absolute values of the sequence h are calculated first, whereafter the main sample is selected from among those samples that have a higher absolute value than the absolute value of the preceding and the following sample. In other words, all the local maximums of the absolute values of the sequence are selected preliminarily.

The main sample will be the sample with the longest interval to the preceding maximum when the sequence is viewed as recurrent (i.e. h(n)=h(n+N), wherein N is the number of elements in the sequence). If the absolute value of the element preceding the candidate for the main sample in the sequence is less than 10% lower than the absolute value of the main sample candidate, this element preceding the candidate for the main sample is selected as the main sample. When the main sample is set, the amplification of the receiver is checked and, if necessary, adjusted to a suitable level.

In method step H, the necessary correction coefficients are calculated on the basis of the pulse response estimate h in order to minimize the interference. The manner of calculating the correction coefficients depends entirely on what kind of filters are used in the reception. For example, if a three-corrector FIR equalizer is utilized, in a manner known per se, for removing the leading samples preceding the main sample (for example two elements preceding the main sample in the sequence), the correctors are obtained directly from the value of the leading samples of the calculated pulse response estimate. If a decision feedback equalizer (DFE) is utilized in a manner known per se in the receiver to remove the tail (the samples following the main sample in the pulse response estimate), the coefficients are correspondingly obtained from the tail of the pulse response h, which, however, must first be treated with the FIR. When the DFE coefficients have been calculated and before the DFE is taken into use, the delay line of the DFE must be set. The DFE delay line must comprise the symbols that have been received before that moment. The symbols can be deduced from the place of the main sample candidate.

In method step I, the receiver is set in a wait condition until the transmitter has repeated the training sequence for the last (third) time, after which data reception is started. The moment the last symbol of the last training sequence will be received is determined by counting symbols from the sampling moment the main sample candidate was found. When the last symbol of the last training sequence has been received, the receiver sets the descrambler to a value corresponding to the value of the scrambler in the transmitter.

In method step J, the transmitter receives data by sampling the data channel, after which the samples are corrected with the calculated correction coefficients before decisions are made based on the samples. In all the method steps, it is made sure that the receiver receives energy from the line. If even a slight energy breakdown is detected on the line, the transmitter proceeds to the condition according to process step A to wait for the reception of a new training sequence.

Figure 2:
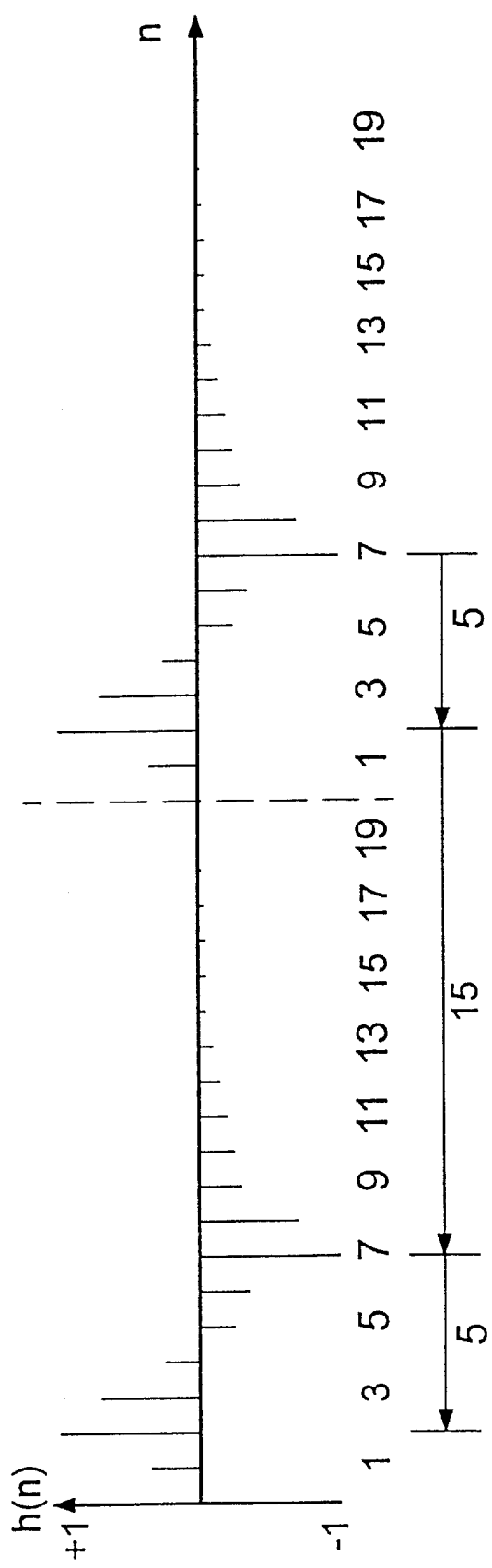
FIG. 2 illustrates the selection of the main sample from the pulse response estimate.

FIG. 2 illustrates the selection of the main sample from the pulse response estimate h (method step G). First, all the absolute values of the sequence h are calculated, whereafter the elements having a higher absolute value than the absolute value of the preceding element and the following element are preliminarily selected from the sample sequence. In other words, all the local maximums of the absolute values of the sample sequence are preliminarily selected. In the case of FIG. 2, samples 2 and 7 are preliminarily selected.

The sample having the longest interval to the preceding maximum, when the sequence is viewed as recurrent as shown in FIG. 2, is selected as the main sample. In the case of FIG. 2, the interval from sample 2 to the preceding sample, i.e. to sample 7, is fifteen units, and from sample 7 to the preceding sample, i.e. to sample 2, five units. Therefore, sample 2 is selected as the candidate for the main sample.

In the following, sample 1 preceding sample 2 will be observed. If the absolute value of sample 1 preceding the main sample candidate 2 is less than 10% lower than the absolute value of the main sample candidate 2, this preceding sample is selected as the main sample. In the case of FIG. 2, the aforementioned requirement is not fulfilled, however, wherefore sample 2 is selected as the main sample. In the case of FIG. 2, the front part of the pulse response therefore contains only one sample, i.e. sample 1. The tail correspondingly consists of samples 3 to 20.

It should be understood that the above description and the drawings related thereto are only intended to illustrate the present invention. Different variations and modifications of the invention will be evident for a person skilled in the art, without departing from the scope and spirit of the invention disclosed in the appended claims.

I claim:

1. A method for establishing a data communication connection in a data channel where pulse amplitude modulation signals are utilized, a transmitter transmitting a training sequence formed of predetermined symbols, a predetermined number of times, said method comprising:

a receiver monitoring the data channel in order to detect a predetermined signal;

taking samples from the data channel and adjusting amplification of the receiver in such a way that signals received by the receiver in consequence of transmissions by the transmitter settle at a predetermined level;

when the transmitter, in transmitting said training sequence, starts repeating the training sequence during a time period it takes to transmit one training sequence, buffering the samples taken from the data channel in said taking in order to form a sample sequence;

calculating a channel pulse response estimate by convoluting the buffered samples with a predetermined symbol sequence;

selecting a main sample from said pulse response estimate such that others of said samples precede and follow said main sample;

calculating correction coefficients from the pulse response estimate on the basis of the samples preceding and following the main sample, in order to minimize interference on the data channel and when the transmitter stops transmitting the training sequence (t) and starts transmitting data, correcting the samples taken from the data channel by utilizing said correction coefficients.

2. A method according to claim 1, wherein:

the transmitter is a modem in a multipoint network and the data channel is a copper cable which, in said taking of samples, is sample twice during each symbol.

3. A method according to claim 1, wherein:

when the energy contained in the samples (t') taken from the data channel exceeds a predetermined threshold level for the first time, in consequence thereof determining that said predetermined signal has been received; and starting a timer means to measure the time period it takes to transmit the training sequence, thereby determining the moment the transmitter starts repeating the training sequence.

4. A method according to claim 1, wherein:

in said calculating, a sequence which forms, when convoluted with the training sequence, a sequence having one element with an approximate value of one and other elements having values approximating to zero, is selected as said predetermined symbol sequence.

5. A method according to claim 1, wherein:

in said selecting, the main sample of the pulse response estimate is selected from the sample sequence in such a way that all the samples having a higher absolute value than a respective following and a respective preceding sample, when the sample sequence is viewed as recurrent, are selected preliminarily, and the sample with a longest interval to the preceding preliminarily selected sample, when the sample sequence is considered as recurrent, is selected from the selected samples as the main sample.

* * * * *